United States Patent
Schäfer et al.

(10) Patent No.: US 10,247,601 B2
(45) Date of Patent: Apr. 2, 2019

(54) METHOD FOR MONITORING RADIATION

(71) Applicant: KUKA INDUSTRIES GMBH & CO. KG., Obernburg (DE)

(72) Inventors: Ansgar Schäfer, Aachen (DE); Lars Soeren Ott, Düren (DE); Klaus R Goebel, Darmstadt (DE)

(73) Assignee: KUKA DETUSCHLAND GMBH, Augsburg (DE)

( * ) Notice: Subject to any disclaimer, the term of this patent is extended or adjusted under 35 U.S.C. 154(b) by 0 days.

(21) Appl. No.: 15/519,854

(22) PCT Filed: Oct. 19, 2015

(86) PCT No.: PCT/EP2015/074163
§ 371 (c)(1),
(2) Date: Apr. 18, 2017

(87) PCT Pub. No.: WO2016/062669
PCT Pub. Date: Apr. 28, 2016

(65) Prior Publication Data
US 2017/0241832 A1    Aug. 24, 2017

(30) Foreign Application Priority Data

Oct. 21, 2014  (DE) .................. 10 2014 115 304

(51) Int. Cl.
*G01J 1/02* (2006.01)
*G01J 1/44* (2006.01)
*G01J 1/42* (2006.01)

(52) U.S. Cl.
CPC ............ *G01J 1/0228* (2013.01); *G01J 1/0271* (2013.01); *G01J 1/42* (2013.01); *G01J 1/44* (2013.01); *G01J 2001/0285* (2013.01); *G01J 2001/4466* (2013.01)

(58) Field of Classification Search
CPC .......... G01J 1/0228; G01J 1/0271; G01J 1/44; G01J 1/42; G01J 2001/4466; G01J 2001/0285
USPC .......................... 250/205, 207, 214.1, 214 R
See application file for complete search history.

(56) References Cited

U.S. PATENT DOCUMENTS

| | | | |
|---|---|---|---|
| 9,121,762 B2 * | 9/2015 | Williams | G01J 1/44 |
| 9,835,490 B2 * | 12/2017 | Williams | G01J 1/44 |
| 2016/0087718 A1 * | 3/2016 | Lucamarini | H04B 10/07955 |
| | | | 398/38 |

FOREIGN PATENT DOCUMENTS

| | | |
|---|---|---|
| CN | 103227231 A1 | 7/2013 |
| DE | 2 245 507 A1 | 3/1974 |
| DE | 36 38 874 C2 | 5/1987 |
| DE | 89 08 806 U1 | 8/1989 |

(Continued)

OTHER PUBLICATIONS

Chinese Office Action dated Dec. 25, 2017, for Chinese Application No. 201580057425.9.

(Continued)

*Primary Examiner* — Seung C Sohn
(74) *Attorney, Agent, or Firm* — Ladas & Parry LLP; Malcolm J. MacDonald

(57) ABSTRACT

A method for monitoring radiation by an optical sensor which generates a signal, such as a shut-off signal, which influences the radiation when subjected to radiation. A sensor with dark current pulses is used, which are assessed as a functional capability signal of the sensor.

16 Claims, 2 Drawing Sheets

(56) References Cited

FOREIGN PATENT DOCUMENTS

| DE | 196 29 037 C1 | 7/1997 |
|---|---|---|
| DE | 199 40 476 A1 | 4/2001 |
| DE | 100 17 284 C1 | 6/2001 |
| DE | 103 25 906 A1 | 12/2004 |
| DE | 10 2006 026 555 A1 | 12/2007 |
| DE | 10 2008 016 856 A1 | 10/2009 |
| EP | 0 321 965 B1 | 6/1989 |
| EP | 1 746 334 B1 | 1/2007 |
| GB | 2 171 513 A | 8/1986 |
| GB | 2 182 746 A | 5/1987 |
| WO | 01/14787 A1 | 3/2001 |

OTHER PUBLICATIONS

Non-English International Search Report dated Jan. 21, 2016 for Application No. PCT/EP2015/074163 with English translation.
Espacenet English abstract of DE 10 2006 026 555 A1.
Espacenet English abstract of DE 199 40 476 A1.
Espacenet English abstract of DE 100 17 284 C1.
Espacenet English abstract of WO 2004/108343 A1 which corresponds to DE 103 25 906 A1.
Espacenet English abstract of DE 196 29 037 C1.
Espacenet English abstract of EP 1 746 334 B1.
Espacenet English abstract of WO 2009/121907 A1 which corresponds to DE 10 2008 016 856 A1.

\* cited by examiner

METHOD FOR MONITORING RADIATION

SUMMARY OF THE INVENTION

The invention relates in particular to a method for monitoring radiation by an optical sensor which generates a signal, in particular a shut-off signal which influences the radiation at least when subjected to radiation.

BACKGROUND OF THE INVENTION

Modern high-performance lasers are used for the working of materials in industrial manufacture. Portal systems and robotic systems allow the user a maximally flexible guiding of the laser radiation to the workpiece. If the laser energy can be guided in light wave conductors to the working site, the dynamics of these systems is considerably increased. In order to insure body and life, passively acting (absorbing) protective walls, usually of metal, with simple plates or with plates arranged multiply in series are constructed around the laser area, the so-called enclosures. Laser radiation occurs with an extremely high energy density within these protective walls.

Additionally, uncontrolled reflections occur due to the working of the workpieces. Direct or indirect laser radiation, in the worst case the raw beam, strikes the enclosure, which for its part has the task of protecting persons outside from the radiation. Depending on the operating type of the laser system, this protection must be ensured for a time t, e.g., until the operator of the system notices the error and can stop it. As a result of the high energy and the often small distances to the protective wall, this time t until shut-off becomes less and less, or the requirements for the material of the enclosure become more and more demanding. Exclusively passive protective walls are therefore only conditionally suitable for securing persons.

The patent publications DE 100 17 284 C1, DE 103 25 906 A 1, DE 196 29 037 C1 only concern the passive protection by different embodiments of the surface qualities or of the intermediate spaces of the walls. The different thermal conductivity properties or the reflection capacity are used for realizing the passive radiation security. However, in practice the surfaces of the protective walls have already been contaminated after a short time by oil, dirt and dust so that the original properties of the protective devices are no longer given.

DE 36 38 874 C2 describes an active method wherein the inner wall facing the laser is provided like a safety fuse with an electrically active conductor. In contrast to the arrangement described here, a secure function is only given if the inner wall is exactly coordinated with the laser wavelength in its absorption behavior and in addition contains an electrically active safety device.

In order to be able to use this system, e.g., for fiber lasers with a very small diameter, the electrical conductor must be embedded in the wall with very narrow meanderings, which means a high constructive expense and a cost-intensive expense.

DE 89 08 806 describes an arrangement almost identical to the one described above.

DE 199 40 4 76 A 1 describes an active arrangement for recognizing optical radiation by any sensors. However, in this method the design of the protective wall is an essential component of the function. The using of thermal sensors on the wall facing the laser requires, depending on the thermal conductivity properties of the wall material, a not inconsiderable number of sensors for a secure shut-off. The described variant with optical sensors and a perforated sheet wall provided with a sheet inside again requires specially constructed wall elements.

EP-B-0 321 965 teaches an arrangement and a method for detecting a laser radiation exiting from a work area. To this end the work area is surrounded by a wall in which a detector is arranged which measures the illumination generated by laser radiation striking the wall. In order to check the sensor a photoemitter is arranged in a housing surrounding the recess whose radiation is received by the receiver for checking its function.

A safety system for checking laser beams can be gathered from GB-A-2 171 513. Here the laser beam is detected by a receiver. In order to check the good functioning of the receiver, an infrared light source is provided whose radiation is detected by the receiver.

DE 10 2006 026 555 A1 teaches a method for the detection of optical radiation such as laser radiation in a defined partial volume of a protective enclosure. Upon a penetration of the laser beam, signals are activated for turning the laser off.

EP 1 746 334 B1 teaches a protective wall for lasers for screening off a laser area.

Sensors are arranged in the wall which react to "hotspots" on the inner wall and accordingly make output signals available for turning off a laser beam.

Both publications have in common the fact that light sources for the emitting of a test beam for the self-monitoring necessary for this safety technology (function testing of the sensors) are also present in the interior of the wall volume to be monitored.

DE 10 2008 016 856 A1 teaches a beam protection element in which sensors detect the penetration of light of an external reference radiation source located externally in the cabin after penetration of the casing of the beam protection element and make appropriate signals available for turning off the laser. A self-monitoring of the sensors is not given.

The invention is based on the problem of using optical sensory technology in particular for active laser protection walls or for beam protection elements, wherein their ability to function is to be checked without an active optical testing with light sources or beam sources having to be used inside the volume to be optically monitored.

In particular, alternative, active laser protection wall sensors, active laser protection walls, active laser protection wall elements (and also their front-part variants in front of a passive protection wall) and active laser protection cabins should result as applications.

DETAILED DESCRIPTION OF THE INVENTION

Figure 1:
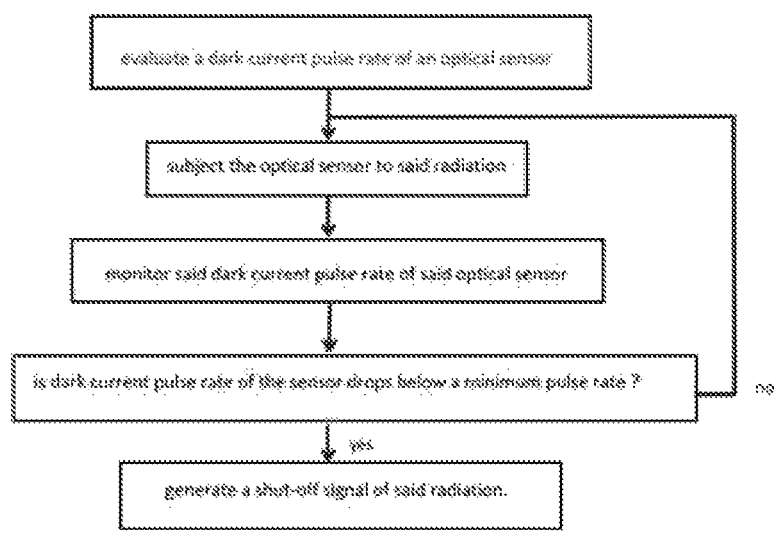
FIG. 1 shows a schematic diagram of the method of the invention.
Figure 2:
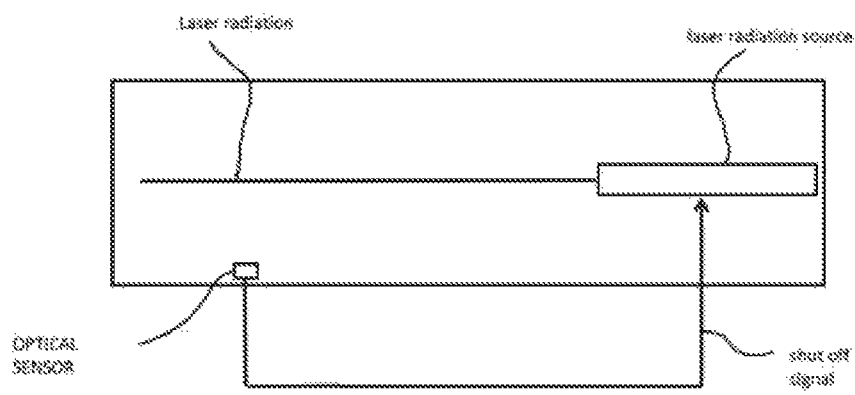
FIG. 2 shows a schematic diagram of the apparatus of the invention.

The starting point of the invention can be the known monitoring of a hollow space against penetrating radiation such as laser radiation, as can be gathered from the previously cited prior art.

It is preferably provided for solving the problem that a sensor with dark current pulses is used which are evaluated as a functional capability signal of the sensor.

In particular, an SPAD (Single Photon Avalanche Diode) is used as sensor.

The sensors are used in order to detect even individual photons and are therefore extremely sensitive.

It is characteristic for the sensors that they are loaded counter to the blocking direction with appropriately high voltage shortly before the breakthrough. Incident light then generates free charge carriers which then ensure a current in the blocking direction of the SPAD via an avalanche breakthrough.

If the current is interrupted (or if the voltage drops below the breakthrough voltage), then the current dies down and the SPAD assumes its blocked state and can subsequently be loaded with voltage. A current pulse is then released again with incident light so that a chain of current pulses results as a function of the incident light.

However, it is additionally characteristic for these SPAD diodes that avalanche breakthroughs already occur based on the "high" applied voltage, which are also thermally conditioned, and therefore a temperature-dependent current pulse rate occurs without incident light. Therefore, obtainable SPAD modules are also usually actively cooled with Peltier elements in order to be able to keep them at a constant temperature and therefore to ensure a constant "dark current pulse rate".

Even the APD (Avalanche Photo Diode), operated in the "Geiger mode), can be considered as a sensor for the invention.

This invention uses precisely these "dark current pulses" as a functional capability signal of the sensors because If these impulses are not present, the sensor is defective.
If the diode is continuously conductive, either light is striking the diode so that it can no longer enter into the blocking state or it has an internal short circuit.
If one of these cases occurs, a signal such as a shut-off signal must be generated in order ensure the influencing such as cutting off the light source like the process laser beam source.
If the diode is above a limit, conditioned by the temperature, of current pulses per time unit (therefore, above the "dark current pulse rate") a start is then to be made from the incidence of light on the diode, and therefore a breakdown, e.g., of a laser protection wall element or of a laser protection wall is present, so that a shut-off signal must be generated for cutting off the process laser beam source. This would be the normal "protection case" for this diode when it is used in an active laser protection wall.

The wiring of the diode can be designed to be purely passive, as is known, with a resistor connected in front (passive quenching), in order to generate this pulse behavior. However, the passive wiring has the disadvantage of a longer "recovery time" of the SPAD so that even with the recognition of the current pulse the voltage can be actively lowered and subsequently raised again in order to achieve a shortened recovery time (active quenching). The "recovery time" is at the same time a blind phase of the sensor since during this time no photons can be detected. Therefore, it must be selected to be short in accordance with the application.

Therefore, the method according to the invention evaluates current pulses or voltage pulses of one or more actively or passively pulsing light sensors or radiation sensors, wherein the sensor still continuously generates current pulses or voltage pulses even in darkness in a closed volume.

The pulses are converted into a frequency or counting rate. This frequency or pulse rate is monitored for a minimum pulse rate. If the minimum pulse rate is dropped below, a shut-off signal is generated which leads to the turning off, e.g., of a laser beam.

Furthermore, this frequency or pulse rate is monitored for a maximum pulse rate. If this maximum pulse rate is exceeded, a shut-off signal is also preferably generated which leads to the turning off e.g. of a laser beam.

This pulse evaluation takes place twice in different evaluation paths for a monitoring directed at safety.

Furthermore, the protective wall elements monitored in this manner or volumes of double-wall protective housings can comprise closable openings. A test of the sensors by incident light is also possible by opening the opening, e.g. for the closing test after the production of the wall element or for regular tests if a contamination of the sensors inside the closed element cannot be excluded.

Independently of the pulse counting rate method, the active protective wall for the test of the sensors can also comprise in the simplest case an automatically activated flap for closing the opening for sensor tests.

Alternatively, the opening can also be closed by optically switching elements which optionally also transmit only a part of the receiving spectrum of the sensors in a switchable manner. As a result of this opening which can be automatically opened and closed, light can penetrate from the outside into the wall and a corresponding reaction of the sensors must be ensured. If this reaction does not take place, a shut-off signal is generated which leads to the turning off of a laser beam.

The features characterizing the invention result from the specification and also from the claims, which, however, are not to be understood as being limiting as regards their feature combinations. Rather, individual features disclosed on the whole, therefore, especially in the specification, are to be evaluated separately as well as in possible combinations as inventive.

The invention claimed is:

1. A method for monitoring a radiation, in particular a laser radiation, the method comprising:
evaluating a dark current pulse rate of an optical sensor;
subjecting the optical sensor to said radiation;
monitoring the dark current pulse rate of the optical sensor; and
if the dark current pulse rate of the optical sensor drops below a minimum pulse rate, generating a shut-off signal of said radiation.

2. The method according to claim 1, wherein the optical sensor is constructed as an active optical sensor a passive optical sensor.

3. The method according to claim 1, wherein the optical sensor comprises one of a Single Photon Avalanche Diode (SPAD) and an Avalanche Photo Diode (APD).

4. The method according to claim 1, comprising generating said shut-off signal of said radiation also if said dark current pulse rate of the optical sensor exceeds a maximum pulse rate.

5. The method according to claim 1, comprising evaluating said dark current pulse rate twice along different evaluation paths.

6. The method according to claim 1, comprising enclosing said optical sensor by one of a protective enclosure and a beam protection wall.

7. The method of claim 6, wherein said beam protection wall is a passive beam protection wall.

8. The method according to claim 1, comprising providing a closable opening in said one of the protective enclosure and the beam protection wall.

9. An apparatus for monitoring a radiation, in particular a laser radiation, the apparatus comprising:

an optical sensor arranged to receive said radiation;
said optical sensor being arranged to monitor a dark current pulse rate of said optical sensor;
said optical sensor being arranged for generating a shut-off signal of said radiation if the dark current pulse rate of the sensor drops below a minimum pulse rate.

10. The apparatus according to claim 9, wherein said optical sensor is constructed as an active optical sensor, or a passive optical sensor.

11. The apparatus according to claim 9, wherein said sensor comprises one of a Single Photon Avalanche Diode (SPAD) and an Avalanche Photo Diode (APD).

12. The apparatus according to claim 9, comprising generating said shut-off signal of said radiation also if said dark current pulse rate of the optical sensor exceeds a maximum pulse rate.

13. The apparatus according to claim 9, comprising two different evaluation paths to evaluate said dark current pulse rate.

14. The apparatus according to claim 9, wherein said optical sensor is enclosed by one of a protective enclosure and a beam protection wall.

15. The apparatus according to claim 14, wherein said one of a protective enclosure and a beam protection wall comprises a closable opening.

16. The apparatus of claim 14, wherein said beam protection wall is a passive beam protection wall.

* * * * *